(12) United States Patent
Kwon et al.

(10) Patent No.: US 10,462,817 B2
(45) Date of Patent: Oct. 29, 2019

(54) METHOD AND APPARATUS FOR CONTROLLING CHANNEL ACCESS IN WIRELESS LOCAL AREA NETWORK (WLAN) SYSTEM

(71) Applicant: ELECTRONICS AND TELECOMMUNICATIONS RESEARCH INSTITUTE, Daejeon (KR)

(72) Inventors: Hyoung Jin Kwon, Daejeon (KR); Hee Jung Yu, Daejeon (KR); Sok Kyu Lee, Daejeon (KR); Jae Seung Lee, Daejeon (KR); Min Ho Cheong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 7 days.

(21) Appl. No.: 15/021,524

(22) PCT Filed: Sep. 11, 2014

(86) PCT No.: PCT/KR2014/008468
§ 371 (c)(1),
(2) Date: Mar. 11, 2016

(87) PCT Pub. No.: WO2015/037914
PCT Pub. Date: Mar. 19, 2015

(65) Prior Publication Data
US 2016/0249383 A1 Aug. 25, 2016

(30) Foreign Application Priority Data

Sep. 11, 2013 (KR) .................. 10-2013-0109264
Jan. 17, 2014 (KR) .................. 10-2014-0006048
Sep. 11, 2014 (KR) .................. 10-2014-0120079

(51) Int. Cl.
*H04W 74/04* (2009.01)
*H04W 72/04* (2009.01)
(Continued)

(52) U.S. Cl.
CPC ............... *H04W 74/04* (2013.01); *H04L 1/00* (2013.01); *H04W 52/0216* (2013.01);
(Continued)

(58) Field of Classification Search
None
See application file for complete search history.

(56) References Cited

U.S. PATENT DOCUMENTS 9,398,611 B2    7/2016  Choi et al.
2010/0144359 A1  6/2010  Song et al.
(Continued)

FOREIGN PATENT DOCUMENTS

CN    101682886 A    3/2010
EP    2 538 614 A1   12/2012
(Continued)

OTHER PUBLICATIONS

International search report for PCT/KR2014/008468 filed on Sep. 11, 2014.
(Continued)

*Primary Examiner* — Bunjob Jaroenchonwanit

(57) ABSTRACT

Disclosed are a method and apparatus for an access point (AP) to control channel access of a station in a wireless local area network (WLAN) system. An AP according to one embodiment may determine resource allocation information for protecting a resource for a station not referring to traffic indication map (TIM) information. The determined resource allocation information is transmitted to a station referring to the TIM information, and the station referring to the TIM
(Continued)

information does not conduct channel access in a time period specified in the resource allocation information.

13 Claims, 4 Drawing Sheets

(51) Int. Cl.
| | |
|---|---|
| *H04L 1/00* | (2006.01) |
| *H04W 52/02* | (2009.01) |
| *H04W 84/12* | (2009.01) |
| *H04W 28/06* | (2009.01) |
| *H04W 74/00* | (2009.01) |

(52) U.S. Cl.
CPC ....... *H04W 52/0229* (2013.01); *H04W 72/04* (2013.01); *H04W 72/042* (2013.01); *H04W 28/06* (2013.01); *H04W 74/00* (2013.01); *H04W 84/12* (2013.01); *Y02D 70/1224* (2018.01); *Y02D 70/1262* (2018.01); *Y02D 70/1264* (2018.01); *Y02D 70/142* (2018.01); *Y02D 70/146* (2018.01)

(56) References Cited

U.S. PATENT DOCUMENTS

| | | | | |
|---|---|---|---|---|
| 2012/0108239 | A1* | 5/2012 | Damnjanovic | H04L 5/0073 |
| | | | | 455/436 |
| 2013/0128798 | A1 | 5/2013 | Liu | |
| 2013/0128831 | A1 | 5/2013 | Calcev et al. | |
| 2013/0188572 | A1 | 7/2013 | Cheong et al. | |
| 2013/0195036 | A1* | 8/2013 | Quan | H04W 72/04 |
| | | | | 370/329 |
| 2014/0313952 | A1* | 10/2014 | Ghosh | H04L 1/00 |
| | | | | 370/311 |
| 2014/0341234 | A1* | 11/2014 | Asterjadhi | H04L 69/324 |
| | | | | 370/474 |
| 2014/0355434 | A1* | 12/2014 | Jafarian | H04W 28/12 |
| | | | | 370/230.1 |
| 2015/0036670 | A1* | 2/2015 | Park | H04W 52/0225 |
| | | | | 370/338 |
| 2015/0043549 | A1* | 2/2015 | Fischer | H04W 52/0229 |
| | | | | 370/336 |
| 2015/0223081 | A1* | 8/2015 | Kim | H04W 76/028 |
| | | | | 370/338 |
| 2016/0127995 | A1* | 5/2016 | Merlin | H04W 52/0209 |
| | | | | 370/311 |
| 2016/0242115 | A1* | 8/2016 | Jafarian | H04W 52/0216 |
| 2017/0127419 | A1* | 5/2017 | Seok | H04W 72/0453 |
| 2017/0142717 | A1* | 5/2017 | Park | H04W 72/0446 |

FOREIGN PATENT DOCUMENTS

| | | |
|---|---|---|
| JP | 2016509437 A | 3/2016 |
| JP | 2016521089 A | 7/2016 |
| JP | 2016521526 A | 7/2016 |
| WO | WO 2013/115630 A1 | 8/2013 |
| WO | WO 2013/122415 A1 | 8/2013 |

OTHER PUBLICATIONS

Eric Wong et al., "Proposed TGah Draft Amendment", IEEE P802.11ah/D0.1, May 9, 2013, p. 1-311, IEEE.

Jae Seung Lee et al., "LB 200 Comment Resolution for Clauses 9.42.2 Part 2", IEEE 802.11-10/1241r61, Mar. 14, 2014, p. 1-4, IEEE.

* cited by examiner

METHOD AND APPARATUS FOR CONTROLLING CHANNEL ACCESS IN WIRELESS LOCAL AREA NETWORK (WLAN) SYSTEM

CROSS REFERENCE TO RELATED APPLICATIONS

The present application is a U.S. National Stage of International Patent Application No. PCT/KR2014/008468 filed Sep. 11, 2014, which claims priority to Korean application number 10-2013-0109264, filed Sep. 11, 2013, Korean application number 10-2014-0006048, filed Jan. 17, 2014, and Korean application number 10-2014-0120079, filed Sep. 11, 2014, which are incorporated by reference in their entirety.

TECHNICAL FIELD

The present invention relates to a wireless communications system, and more particularly to a method and apparatus for controlling channel access in a wireless local area network (WLAN) system and a station operating according to the same.

BACKGROUND ART

A wireless local area network (WLAN) enables wireless Internet access at home or offices or in specific service areas using portable terminals on the basis of radio frequency technologies. When there are too many stations (STAs) in a WLAN, probability of collisions happening between STAs in a channel access process increases. STAs which perform channel access without listening to a beacon signal may be in contention with other STAs allocated slots in the channel access process, and such contention may deteriorate efficiency of the entire network.

DISCLOSURE OF INVENTION

Technical solutions

According to an aspect of the present invention, there is provided a method of controlling channel access, the method including determining resource allocation information for protecting a resource for a first station not referring to traffic indication map (TIM) information from a second station referring to the TIM information; and broadcasting the resource allocation information.

The first station may request protection of the resource when requesting the resource to an access point (AP).

The first station may transmit a bit value indicating whether protection of the resource is requested to the AP whenever requesting the resource.

The bit value indicating whether protection of the resource is requested may be transmitted, being included in a control field or a request type field of a target wake time (TWT) element.

The method may further include transmitting response data indicating whether a requested resource is protected to the first station when a request for the resource is received from the first station.

The determining of the resource allocation information may include determining resource allocation information for restricting channel access of the second station in a time period for channel access of the first station.

The resource allocation information may include information on a restricted access window (RAW) for protecting the resource for the first station.

The second station may not perform channel access in a time period corresponding to the RAW.

The determining of the resource allocation information may include receiving request data for resource protection from the first station, and determining the resource allocation information setting a time period requested by the first station for protection through an RAW when the request data is received.

The determining of the resource allocation information may include transmitting response data indicating whether protection of the resource is possible to the first station in response to the request data when the request data is received.

The determining of the resource allocation information includes receiving control data indicating whether resource protection is requested from the first station; and determining whether the first station requests resource protection on the basis of the control data and determining the resource allocation information setting a time period requested by the first station for protection through an RAW when the first station requests resource protection.

The resource allocation information may be transmitted to the second station, being included in a beacon signal.

The second station may be a TIM station checking buffered downlink data through a beacon signal transmitted from the AP, and the first station may be a non-TIM station not checking the beacon signal and the buffered downlink data.

According to another aspect of the present invention, there is provided a station performing channel access to an AP without referring to TIM information, the station including a controller to generate request data for requesting resource protection to the AP; and a communication unit to transmit the request data to the AP.

The communication unit may receive response data indicating whether resource protection is possible from the AP in response to the request data.

According to still another aspect of the present invention, there is provided an AP including a controller to determine resource allocation information for protecting a resource for a first station not referring to TIM information from a second station referring to the TIM information; and a communication unit to broadcast the resource allocation information.

The first station may request protection of the resource when requesting the resource to the AP.

The first station may transmit a bit value indicating whether protection of the resource is requested to the AP whenever requesting the resource.

The bit value indicating whether protection of the resource is requested may be transmitted, being included in a control field or a request type field of a TWT element.

The controller may determine resource allocation information for protecting a resource requested by the first station for protection from the second station when the first station requests protection of the resource.

The controller may determine resource allocation information for restricting channel access of the second station in a time period for channel access of the first station.

The resource allocation information may include information on an RAW for protecting the resource for the first station.

The second station may not perform channel access in a time period corresponding to the RAW.

The communication unit may receive request data for resource protection from the first station, and the controller may determine the resource allocation information setting a time period requested by the first station for protection through an RAW when the request data is received.

The communication unit may transmit response data indicating whether a requested resource is protected to the first station when a request for the resource is received from the first station.

According to yet another aspect of the present invention, there is provided an AP including a communication unit to receive request data for resource protection from a station not referring to TIM information; and a controller to generate resource allocation information for protecting a resource requested by the station through an RAW when the request data is received, wherein the communication unit broadcasts the resource allocation information.

BEST MODE FOR CARRYING OUT THE INVENTION

Figure 1:
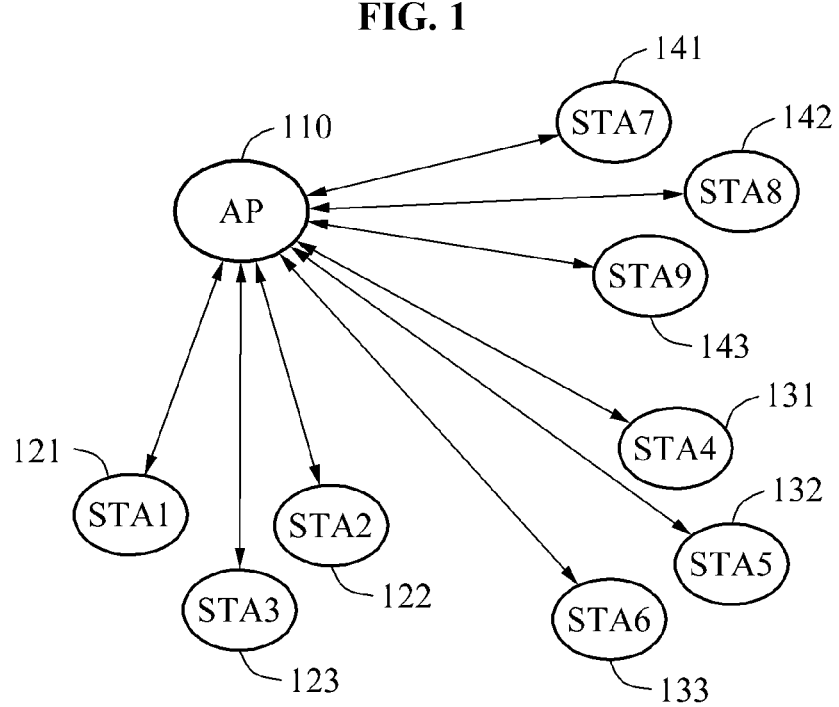
FIG. 1 illustrates a wireless local area network (WLAN) environment including an access point (AP) and a plurality of stations (STAs) according to an embodiment of the present invention.

Hereinafter, exemplary embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters.

The following embodiments are constructed by combining components and features of the present invention into particular forms. Each component or feature may be considered optional unless mentioned otherwise. Each component or feature may be embodied in a separate form from another component or feature. Also, some components and/or features may be combined to construct an embodiment of the present invention. Operations illustrated in embodiments of the present invention may be carried out in a different order. Some elements or features of one embodiment may be included in another embodiment or be replaced with corresponding elements or features of another embodiment.

Specific terms to be used in the following description are provided for better understanding of the present invention and may be changed with other forms without departing from the technical scope of the present invention.

In some cases, to prevent the concept of the present invention from being ambiguous, structures and apparatuses of the known art will be omitted, or will be shown in the form of a block diagram based on main functions of each structure and apparatus. Also, like reference numerals refer to like elements throughout the specification.

The embodiments of the present invention may be supported by standards disclosed in at least one of wireless access systems, such as Institute of Electrical and Electronics Engineers (IEEE) 802 system, 3rd Generation Partnership Project (3GPP) system, 3GPP Long-Term Evolution (LTE) and LTE-Advanced (LTE-A) system and 3rd Generation Partnership Project 2 (3GPP2) system. That is, operations or portions not mentioned in the embodiments to clarify the technical scope of the present invention may be supported by the standards. All terms used in this specification may be explained by the standards.

The following technology may be used for various types of wireless access systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be realized by radio technologies, such as Universal Terrestrial Radio Access (UTRA) or CDMA2000. TDMA may be realized by radio technologies, such as Global System for Mobile communications (GSM)/General Packet Radio Service (GPRS)/Enhanced Data Rates for GSM Evolution (EDGE). OFDMA may be realized by radio technologies, such as IEEE 802.11 (Wi-Fi), IEEE 802.16 (WiMAX), IEEE 802-20, and E-UTRA (Evolved UTRA). Although the following description will be made with reference to the IEEE 802.11 system for clarity, the technical scope of the present invention is not limited thereto.

FIG. 1 illustrates a wireless local area network (WLAN) environment including an access point and a plurality of stations according to an embodiment of the present invention.

The WLAN environment may include a plurality of components, in which communications are performed by interactions between the components. A basic constituent block of a WLAN system is referred to as a basic service set (BSS), which may include an access point (AP) 110 and one or more stations (STAs).

An AP is a functional entity which provides connection to a distribution system via a wireless medium for an STA associated with the AP. In an infrastructure BSS including an AP, communications between STAs are basically performed via the AP, but direct communications between STAs are possible when a direct link is established. The AP may also be referred to as a central controller, base station (BS), node-B, base transceiver system (BTS), site controller or administrative STA.

An STA is a functional medium including a physical layer interface for medium access control (MAC) and wireless medium in accordance with IEEE 802.11. The STA may also be referred as a mobile terminal, wireless device, wireless transmit/receive unit (WTRU), user equipment (UE), mobile station (MS), mobile subscriber unit) or simply user.

A WLAN defines a power saving mode (PSM) to save power consumption of STAs. An AP periodically transmits a beacon signal and notifies an STA of presence of a buffered frame through a traffic indication map (TIM) field of the beacon signal. STA1, STA2, STA3, STA4, STA5, STA6, STAT, STAB, and STA9 121 to 143 are represented by an STA in the following description.

An STA in sleep mode may periodically wake up to receive TIM information of a beacon signal transmitted from the AP 110. When a bit value corresponding to a specific STA is 0 in the TIM information, the STA may go back to sleep. When the bit value of the specific STA is 1 in the TIM information, the STA wakes up until a last frame scheduled in a current beacon period is transmitted. The STA may check a More Data field of a header of a frame transmitted by the AP 110 to identify whether the frame is a last frame. For example, when the More Data field is 0, the STA may determine that the received frame is the last scheduled frame.

In the PSM, an amount of power consumed by the STA is determined based on not only traffic transmitted to the STA but also a traffic amount of another STA, because data transmission between the AP 110 and the STA may be interrupted by an attempt at data transmission between the AP 110 and another STA. When such an interruption occurs, it takes longer time for the STA to receive all buffered frames, and thus the STA consumes greater power. As an increasing number of STAs communicate with the AP 110, greater power is consumed.

To minimize occurrence of interruptions, the AP 110 may allocate STAs different times to access a channel, thereby reducing a number of STAs simultaneously accessing the channel. To allocate a time period for a specific STA to access the channel, the AP 110 may divide a time interval between beacon signal transmission times or smaller time interval into slots and allocate a slot to the STA. Allocating a slot to an STA to control channel access of the STA is defined as slot-based channel access. The STA may access the channel in a time period of an allocated slot.

The AP 110 may allocate a slot to each STA or a group of STAs and allocate a Restricted Access Window (RAW) or Periodic RAW (PRAW) including the slot. A PRAW may be used to protect a periodically allocated resource as an RAW.

A general STA may notify the AP 110 of presence of the STA through management operations, such as association or negotiation processes, and of preference with respect to downlink transmission. For instance, instructions and verification of such information may be carried out through an association request/response process or a probe request/response process between the STA and the AP 110.

Setting up preference of the STA with respect to downlink transmission may include one of a method of recognizing existence of downlink data by referring to a TIM and receiving the downlink data and a method of receiving downlink data without referring to a TIM. A purpose of the AP 110 providing TIM information to an STA is to allow the STA to access a channel only within a time resource indicated by the TIM information, thereby enhancing efficiency in utilization of the resource.

The STA may verify, by referring to the TIM information, whether the STA needs to receive data transmitted from the AP 110 or not. A slot allocated by STA may be identified through a position of each STA in a TIM bitmap included in a beacon signal. The STA may periodically receive a beacon signal transmitted from the AP 110, interpret the TIM information included in the beacon signal, and go to a sleep mode when no data to be transmitted to the STA is identified. When there is data to be transmitted to the STA, the STA may go to a mode for receiving data, instead of going to the sleep mode. As such, an STA which receives a beacon signal and verifies existence of data to be transmitted to the STA by referring to TIM information included in the beacon signal is defined as a TIM STA.

A TIM STA may verify TIM information and calculate a position thereof to perform channel access from a start point of an allocated slot. A slot may be allocated to all STAs included in the TIM information or to each group of a plurality of groups into which TIM STAs are divided. Since data size and channels involved in transmission may be different depending on TIM STAs, time needed to transmit data to a TIM STA may vary by TIM STA and different numbers of slots may be needed by TIM STA.

Unlike the TIM STA, an STA operating without checking the TIM information included in the beacon signal may be defined as a non-TIM STA. The non-TIM STA may operate without being directed by the TIM information. The non-TIM STA may wake up at random time, instead of receiving a beacon signal, and transmit a power save-poll (PS-Poll) frame to the AP 110 to verify whether there is buffered data for the non-TIM STA to receive. Further, the non-TIM STA may wake up at random time and transmit a trigger frame to the AP 110 to notify the AP 110 that a service period for receiving data from the AP 110 starts. In addition, the non-TIM STA may wake up at random time and transmit uplink data to the AP 110. A time at which the non-TIM STA wakes up at random time and transmits the PS-Poll frame, trigger frame or uplink data frame may overlap with target beacon transmission time (TBTT) at which the AP 110 transmits a beacon signal or with an RAW allocated for another STA. The non-TIM STA includes a target wake time (TWT) STA and an unscheduled active polling STA, wherein the TWT STA includes a null data packet (NDP) paging STA as a scheduled active polling STA.

The AP 110 may protect a resource required by a non-TIM STA from TIM STAs. For example, the AP 110 may protect a resource needed by a TWT STA, NDP paging STA and unscheduled active polling STA from TIM STAs. The AP 110 reduces probability of collisions occurring between STAs due to channel access to save energy consumed by STAs.

Figure 2:
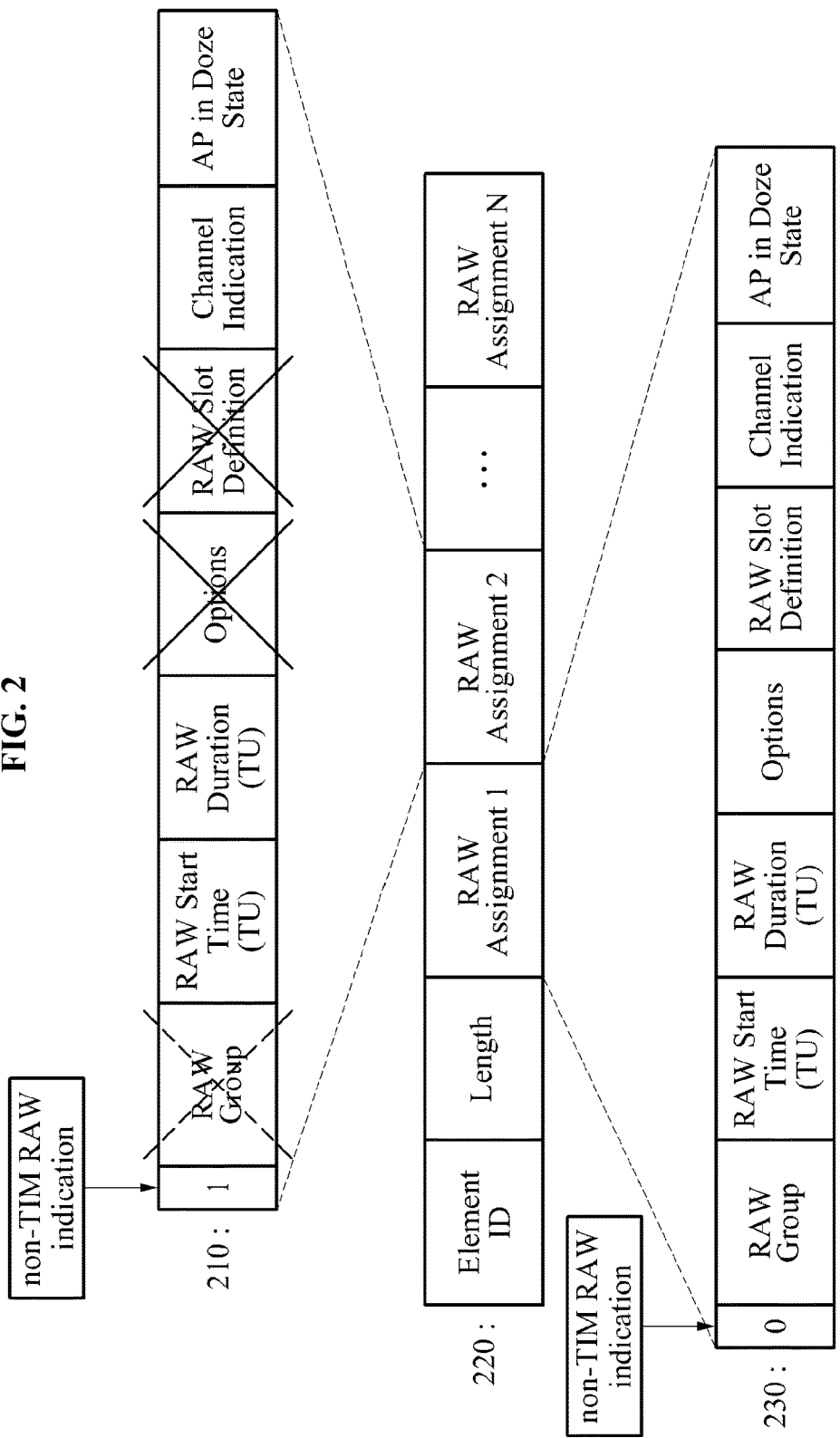
FIG. 2 illustrates a field used for indicating a resource allocated for a non-traffic indication map (TIM) STA according to an embodiment of the present invention.

FIG. 2 illustrates a field used for indicating a resource allocated for a non-TIM STA according to an embodiment of the present invention.

In detail, FIG. 2 illustrates an example of protecting a resource for a TWT STA or non-TIM STA using a non-TIM RAW indication with respect to an RAW parameter set information element (RPS IE) 210 and an RPS IE 230 included in an RAW frame 220. For instance, an RPS IE is RAW information, which may include RAW group information, RAW start time information, RAW duration information and slot information.

When the non-TIM RAW indication is set to 1, unnecessary information may be deleted from the RPS IE. For example, an RAW slot definition field, options field or RAW group field may be deleted from the RPS IE. Any field may be deleted, without being particularly limited. When the non-TIM RAW indication is set to 0, all related fields may be used without deleting any field.

In one embodiment, when the non-TIM RAW indication is set to 1 and the RAW Group field is deleted, STAs other than the TWT STA or non-TIM STA may not access a channel set in a CH Indication for RAW Duration from a RAW Start Time. The TWT STA may verify the RPS IE 210, and operate at TWT allocated to the TWT STA when the allocated TWT is within the RAW Duration from the RAW Start Time. The non-TIM STA is allowed to access the channel at any time.

In another embodiment, when the non-TIM RAW indication is set to 1 and the RAW Group field is not deleted, an STA does not access a channel in a time period defined in the RPS IE when the STA does not belong to an RAW group defined in the RPS IE.

A method of using the non-TIM RAW indication is extended for an unscheduled active polling STA as follows. Since an unscheduled active polling STA is allowed to operate from an association operation when the STA notifies the AP that the STA is a non-TIM STA and receives permission for non-TIM support from the AP, the AP may group and separately manage non-TIM STAs by association identifier (AID). The AP may schedule an RAW for an unscheduled active polling STA in advance, and notify the STA of time of the RAW to conduct data transmission when the unscheduled active polling STA wakes up and succeeds in accessing a channel.

Figure 3:
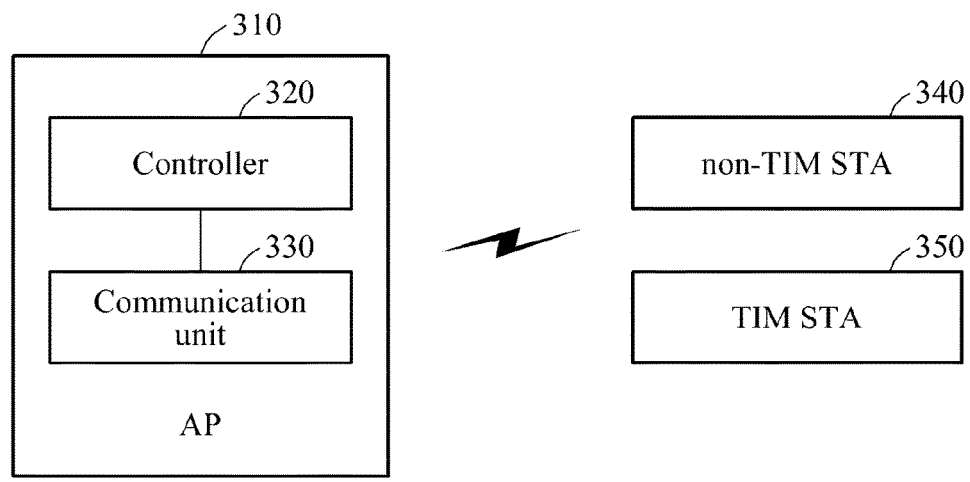
FIG. 3 illustrates a configuration of an AP according to an embodiment of the present invention.

FIG. 3 illustrates a configuration of an AP according to an embodiment of the present invention.

The AP 310 may transmit a beacon signal to STAs. The AP 310 may periodically broadcast a beacon signal, wherein the beacon signal may include information on a BSS managed by the AP 310. An STA may stand by to receive the beacon signal and acquire network information from the beacon signal. Alternatively, the STA may actively broadcast a probe request frame to request network information from the AP 310 receiving the probe request frame. The AP 310 receiving the probe request frame may include network information in a probe response frame to transmit the probe response frame to the STA.

The beacon signal may include TIM information. The TIM information may include information indicating to which STA the AP 310 transmits data. Among STAs, an STA determining whether data is transmitted to the STA and determining whether to wake up or to operate in sleep mode based on the TIM information in the beacon signal is defined as a TIM STA 350. On the contrary, an STA not referring to the TIM information in the beacon signal is defined as a non-TIM STA 340. The TIM STA 350 may check buffered downlink data through the beacon signal transmitted from the AP 310, and the non-TIM STA 340 may not check the beacon signal and buffered downlink data.

The non-TIM STA 340 may include a scheduled active polling STA which is allocated a slot for performing channel access by request to the AP 310 and performs channel access in the allocated slot, an unscheduled active polling STA which performs channel access without being allocated a slot, or an STA which performs power saving through NDP paging.

The AP 310 may protect a resource for the non-TIM STA 340 from the TIM STA 350. For example, the AP 310 may protect the resource for the non-TIM STA 340 using an RAW. The AP 310 may set the resource to protect for the non-TIM STA 340 as an RAW and transmit a beacon signal including information on the RAW. The TIM STA 350 receiving the beacon signal identifies a time period protected by the RAW based on the RAW information included in the beacon signal and does not perform channel access in the time period, thereby preventing collisions between the non-TIM STA 340 and the TIM STA 350.

The AP 310 may transmit the RAW information for the non-TIM STA 340 by including in an RPS IE of the beacon signal. The RAW allocated to protect the resource for the non-TIM STA 340 is referred to as a non-TIM RAW. Non-TIM RAW allocation information is included in the RPS IE of the beacon signal, and the TIM STA 350 receiving the beacon signal does not perform channel access in the time period allocated as the non-TIM RAW based on the non-TIM RAW allocation information included in the RPS IE. For example, the TIM STA 350 may set an entire time period of the non-TIM RAW as a network allocation vector (NAV) and implement virtual carrier sensing (CS) to set a channel as being busy. Accordingly, the TIM STA 350 is not in contention to access the channel with other STAs, thereby reducing power consumption of the STA.

Referring to FIG. 3, the AP 310 may include a controller 320 and a communication unit 330.

The AP 310 may conduct a setup process with the non-TIM STA 340 to protect the resource for the non-TIM STA 340 (or first STA) from the TIM STA 350 (or second STA). The controller 320 may control the setup process with the non-TIM STA 340, and the communication unit 330 may perform communications with the non-TIM STA 340. The communication unit 330 may receive request data for resource protection from the non-TIM STA 340, and the controller 320 may generate resource allocation information for protecting the resource for the non-TIM STA 340 not referring to the TIM information from the TIM STA 350 referring to the TIM information when the request data is received. The communication unit 330 may broadcast the determined resource allocation information. The resource allocation information may be transmitted, being included in the beacon signal.

The controller 320 may determine resource allocation information for restricting channel access of the TIM STA 350 in a time period for channel access of the non-TIM STA 340. For instance, the resource allocation information may include the RAW information for protecting the resource for the non-TIM STA 340. The TIM STA 350 may receive the beacon signal and acquire the RAW information allocated for the non-TIM STA 340 by referring to the resource allocation information included in the beacon signal. The TIM STA 350 may not perform channel access in the time period corresponding to the RAW allocated for the non-TIM STA 340.

The AP 310 may perform the setup process with the non-TIM STA 340 first to generate the resource allocation information for protecting the resource for the non-TIM STA 340, thereby determining whether to protect the resource or determining a resource to protect.

Although a setup process between the AP 310 and a TWT STA or unscheduled active polling STA as the non-TIM STA 340 is illustrated below, the scope of the present invention is not constructed as being limited thereto.

<Setup Process Between AP 310 and TWT STA According to One Embodiment>

According to one embodiment, the setup process between the AP 310 and a TWT STA may be performed on the basis of a setting in a capability field of an 802.11 management frame. First, a dot11RAWOptionActivated field is set to 1 so that the AP 310 performs protection through an RAW.

The capability field may be divided into two fields depending on whether a resource to protect is for a TWT STA which supports TWT or for an unscheduled active polling STA not supporting TWT. In a case where the resource to protect is for the TWT STA, when a TWT support field is set to 1, the controller 320 may set a TWT protection support field to 1 in order to support protection of the resource for the TWT STA. In a case where the resource to protect is for the unscheduled active polling STA, when a non-TIM support field is set to 1, the controller 320 may set a non-TIM protection support field to 1 in order to support a function of protecting the resource for channel access of the unscheduled active polling STA from the TIM STA 350.

The TWT STA may also set up a capability field in a similar manner to that by the AP 310. To protect the resource for the TWT STA, the TWT STA may set a TWT protection support field to 1 when a TWT support field is set to 1. When the unscheduled active polling STA intends to request protection of the resource to the AP 310 so as to reduce collisions in channel access, the unscheduled active polling STA sets a non-TIM protection support field to 1 when a non-TIM support field is set to 1 and the TWT support field is set to 0.

In either of the two aforementioned cases, the TWT STA capable of requesting resource protection may request resource protection to the AP 310 capable of supporting resource protection. The TWT STA may transmit request data for resource protection to the AP 310 to request resource protection. The controller 320 may set the resource requested by the TWT STA as an RAW to protect. The request data for resource protection may include a capability field, a bit value of which may indicate whether the TWT STA requests resource protection. For instance, the TWT STA may set a TWT protection support capability field or Non-TIM protection support capability field of a capability element included in an association request frame or reassociation request frame to 1, thereby notifying the AP 310 that a request for resource protection is made.

When the request data for resource protection is received from the non-TIM STA 340, the controller 320 may determine resource allocation information setting a resource in a time period requested by the non-TIM STA 340 for protection as an RAW. When the request data for resource protection is received from the non-TIM STA 340, the communication unit 330 may transmit, to the non-TIM STA 340, response data indicating whether protection of the resource requested by the non-TIM STA 340 is possible in response to the request data.

For example, when the communication unit 330 receives a frame with a TWT protection support capability field set to 1 from the TWT STA, the controller 320 may set a TWT service period (SP) of the TWT STA transmitting the frame as an RAW to protect the resource for the TWT STA. The controller 320 may protect all TWT service period of the TWT STA through the RAW.

Alternatively, when the communication unit 330 receives a frame with a non-TIM protection support capability set to 1 from the TWT STA, a duration value indicating wakeup time of the TWT STA in a response acknowledgement (ACK) frame to a PS-Poll frame with a pill type sub-field of a frame control field set to 3 transmitted by the TWT STA at random time may be set to indicate a time after TBTT at which a beacon signal including an RPS IE indicating protection through an RAW is transmitted. Accordingly, channel access of the TIM STA 350 the BSS is not allowed at least during a transmission opportunity (TxOP) after the duration value.

Also, when a bit of one integrated field (for example, RAW protection capability) of two fields of the AP 310 is set to 1, resources for the TWT STA and the non-TIM STA 340 are protected through an RAW. When a bit of one integrated field of the non-TIM STA 340 is set to 1, RAW protection is requested depending on non-TIM/TWT support of the STA.

The TWT STA may identify whether the AP 310 supports RAW protection through a beacon signal or probe response frame of the AP 310, and the TWT STA may use an identification result to select an AP 310 which the TWT STA is associated with in an association process with the AP 310. Also, the AP 310 may not need to negotiate with the TWT STA for whether to protect a resource whenever setting a TWT.

<Setup Process Between AP 310 and TWT STA According to Another Embodiment>

According to another embodiment, a request for resource protection is not maintained since the request is made once by the TWT STA through a capability field of an IEEE 802.11 management frame, but the TWT STA may report whether to protect a resource whenever requesting the resource. The TWT STA may request resource protection by TWT and notify the AP 310 whether a resource is protected. The AP 310 may implicitly determine that RAW capability is set.

When the TWT STA requests a TWT resource to the AP 310, the TWT STA may also request protection of the resource. The TWT STA may transmit a bit value indicating whether protection of the resource is requested to the AP 310 whenever requesting the resource. The AP 310 may transmit, to the TWT STA, a bit value indicating whether the resource requested by the TWT STA is protected, being included in TWT response data (or response frame). That is, when the AP 310 receives the request for the resource from the TWT STA, the communication unit 330 may transmit the response data indicating whether the resource requested by the TWT STA is protected to the TWT STA. When the AP 310 determines to protect the resource requested by the TWT STA, the AP 310 may determine resource allocation information for protecting the resource requested by the TWT STA from a TIM STA.

The AP 310 needs to perform TWT negotiations with the TWT STA based on traffic properties, such as periodicity, latency and service period, in which a request for resource protection may change depending on TWT negotiations. In addition, it may also change whether the AP 310 is able to perform protection of new TWT. As the TWT STA requests resource protection if needed and the AP 310 protects the resource for the TWT STA considering circumstances, flexible scheduling is possible and a TWT setting desired by the TWT STA may be reflected.

To this end, control data indicating whether resource protection is requested may be used. The communication unit 330 may receive control data indicating whether resource protection is requested from the TWT STA. The controller 320 may determine whether the TWT STA requests resource protection on the basis of the received control data. When the TWT STA requests resource protection and the controller 320 determines to protect the resource in a time period requested by the TWT STA for protection, the controller 320 may determine resource allocation information which sets the resource in the time period as an RAW for protection. When the control data indicating whether resource protection is requested is received from the TWT STA, the communication unit 330 may transmit, to the TWT STA, TWT response data indicating a guarantee of protecting the resource requested by the TWT STA through the RAW or TWT response data indicating that the resource requested by the TWT STA may not be protect.

Figure 5:
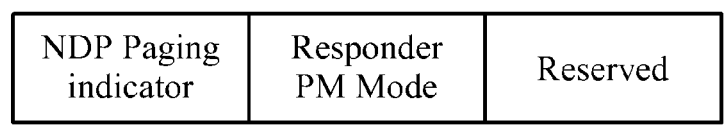
FIG. 5 illustrates a format of a control field of a Target Wakeup Time (TWT) element according to an embodiment of the present invention.

For example, when the TWT STA requests TWT to the AP 310, 1 bit of a control field of a TWT element shown in FIG. 5 may be defined as an RAW protection bit. FIG. 5 illustrates a format of the control field of the TWT element, wherein one bit of reserved bits of the control field may be defined as the RAW protection bit. When the bit is set to 1, the controller 320 may determine that the TWT STA requests not only a TWT resource but also protection of the resource through the RAW. When the bit is set to 0, the controller 320 may determine that the TWT STA does not request protection of the TWT resource through the RAW. The communication unit 330 may define a bit value indicating whether the resource requested by the TWT STA is protected in the TWT control field of the TWT element and transmit TWT response data including the TWT control field to the TWT STA.

Alternatively, when the TWT STA requests TWT to the AP 310, one bit of a request type field of the TWT element may be defined as an RAW protection bit. When the bit is set to 1, the controller 320 may determine that the TWT STA requests not only a TWT resource but also protection of the resource through the RAW. When the bit is set to 0, the controller 320 may determine that the TWT STA does not request protection of the TWT resource through the RAW. The communication unit 330 may define a bit value indicating whether the resource requested by the TWT STA is protected in the TWT request field of the TWT element and transmit TWT response data including the TWT request field to the TWT STA.

The TWT STA requesting the TWT resource may set the RAW protection bit of the TWT element to 1 so as to request protection of the resource along with the resource to the AP 310. When the AP 310 receives the TWT element with the RAW protection bit set to 1 from the TWT STA, the controller 320 may determine whether to protect the resource requested by the TWT and the communication unit 330 may transmit TWT response data (or response frame) defining the bit value indicating whether the resource requested by the TWT STA is protected to the TWT STA. When the bit value defined in the TWT response data is 1, the resource requested by the TWT STA through the TWT element is guaranteed to be protected. When the bit value is 0, the resource requested by the TWT STA may not be protected. When the controller 320 determines to protect the resource requested by the TWT STA, the controller 320 may protect the resource requested by the TWT STA (for example, a time period from TWT to a specific time) as an RAW and prevent a TIM STA from accessing the resource. Information on the RAW may be included and broadcasted in the resource allocation information.

The TWT STA requesting the TWT resource may set the RAW protection bit of the TWT element to 0 in order to notify the AP 310 that it is unnecessary to protect the resource requested by the TWT STA. When the AP 310 receives the TWT element from the TWT STA, the AP 310 may transmit, to the TWT STA, TWT response data (or response frame) indicating whether the resource requested by the TWT STA is protected by the RAW. The response data may include a bit value indicating whether the resource requested by the TWT STA is protected, wherein the bit value equal to 1 indicates that the resource requested by the TWT STA through the TWT element is guaranteed to be protected and the bit value equal to 0 indicates that the resource requested by the TWT STA may not be protected.

A case where the TWT STA requesting the TWT resource sets the RAW protection bit may be considered different from a case where the AP 310 sets the RAW protection bit. The non-TIM STA 340 sets the RAW protection bit to 1 so as to request that TWT be set considering protection of a TWT parameter preferentially when RAW protection is not performed with the TWT parameter requested to the AP 310 being satisfied, in addition to a request of the TWT STA for RAW protection to the AP 310. The TWT STA sets the RAW protection bit to 0 in order to request that TWT be set considering a TWT parameter preferentially rather than RAW protection.

<Setup Process Between AP 310 and TWT STA According to Still Another Embodiment>

According to still another embodiment, the AP 310 capable of performing RAW protection may set a capability field to notify the TWT STA whether resource protection is possible, and the TWT STA requesting RAW protection may notify the AP 310 whether resource protection is requested. The TWT STA may use a value of the capability field to select an AP 310 that the TWT STA is associated with. After associated with the AP 310, the TWT STA setting an RAW protection capability field to 1 may basically request TWT protection whenever setting TWT. When requested TWT is not allocated by the AP 310, the TWT STA may prioritize TWT protection and a TWT parameter for protection. The TWT STA setting the RAW protection capability field to 0 may operate in the same manner as at a conventional TWT setting, without considering TWT protection when setting TWT. Thus, RAW protection setting negotiations other than a first negotiation may be performed under a condition that both the AP 310 and the TWT STA set the capability field to 1.

<Setup Process Between AP 310 and Unscheduled Active Polling STA According to One Embodiment>

RAW protection mentioned above may be also applied to a time period allocated by the AP 310 for channel access of an unscheduled active polling STA in addition to the TWT STA. The unscheduled active polling STA may request duration including up to time to reschedule an awake/doze cycle of the STA while transmitting a PS-Poll frame to the AP 310. For example, the requested duration may be a time period including up to TBTT of a beacon signal for acquiring necessary information or up to a service period for exchanging data. The unscheduled active polling STA receiving a response frame including the time period is in doze mode, without conducting channel access, for the time period and wakes up after the time period to conduct channel access.

The controller 320 may verify the request from the unscheduled active polling STA on the basis of a value of a poll type subfield of a frame control field of the PS-Poll frame. The unscheduled active polling STA may first request time period information including up to a service period to schedule as a response frame, simultaneously with transmitting a PS-Poll frame with a poll type set to 3 to request rescheduling of the awake/doze cycle. When the unscheduled active polling STA setting a non-TIM support field to 1 requests a PS-Poll frame with a poll type value of 3, the controller 320 may perform RAW protection to protect the service period through an RAW. To this end, the controller 320 may adjust a start point of the service period after TBTT at which the beacon signal is transmitted. Here, the beacon signal may include an RPS IE signaling the RAW including the service period. If adjusting the start point is impossible, the controller 320 may report time in the RAW indicated already in the RPS IE as the start point of the service period. In this case, for example, although the unscheduled active polling STA may be in contention with other TWT STAs, the controller 320 may reschedule the service period expected to involve less contention.

When the AP 310 delays allocating a resource for the unscheduled active polling STA and thus is unable to perform RAW protection, the AP 310 may notify the unscheduled active polling STA that RAW protection is not performed. For example, the controller 320 may notify the unscheduled active polling STA whether RAW protection is performed through any one of reserved bits of an NDP ACK frame and NOD modified ACK frame. The controller 320 may set the bit to 1 to indicate that RAW protection is performed and set the bit to 0 to indicate that RAW protection is not performed.

Figure 4:
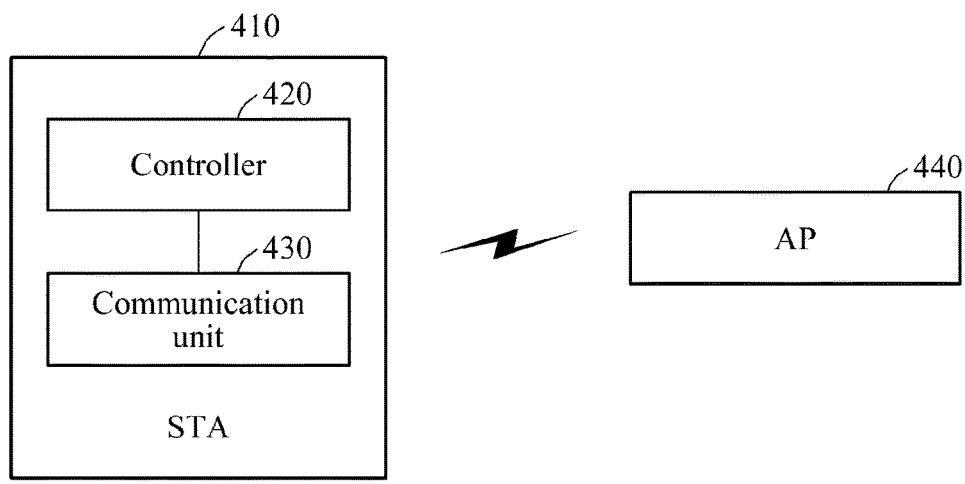
FIG. 4 illustrates a configuration of an STA according to an embodiment of the present invention.

FIG. 4 illustrates a configuration of an STA according to an embodiment of the present invention.

The STA 410 of FIG. 4 may be a non-TIM STA performing channel access to an AP 440 without referring to TIM information. Referring to FIG. 4, the STA 410 may include a controller 420 and a communication unit 430.

The controller 420 may generate request data for requesting resource protection to the AP 440. In one embodiment, the request data may include a capability field of an 802.11 management frame, and the controller 420 may indicate whether to request resource protection to the AP 440 through a bit value of the capability field. The communication unit 430 may transmit the generated request data to the AP 440. The communication unit 430 may receive response data indicating whether resource protection is possible from the AP 440 in response to the request data. When the STA 410 requests a resource and protection of the resource together, the AP 440 may generate resource allocation information setting the requested resource as an RAW and broadcast the generated resource allocation information. The resource allocation information generated by the AP 440 may be broadcasted, being included in a beacon signal transmitted by the AP 440, and the TIM STA receiving the resource allocation information does not perform channel access in an RAW period set by the AP 440.

Alternatively, the STA 410 may be a TWT STA and request protection of a TWT resource to the AP 440 whenever requesting the TWT resource to the AP 440. When a request for the resource is made to the AP, the controller 420 may generate request data including a bit value indicating whether protection of the resource is requested. The bit value indicating whether protection of the TWT resource is requested may be transmitted, being included in a control field or request type field of a TWT element. The communication unit 430 may receive response data indicating whether the resource requested by the STA 410 is protected from the AP 440. The controller 420 may identify whether the resource requested by the STA 410 is protected on the basis of the response data received from the AP 440.

The STA 410 of FIG. 4 corresponds to the non-TIM STA 340 of FIG. 3, and description of the STA 410 not mentioned herein may refer to related description of FIG. 3.

Figure 6:
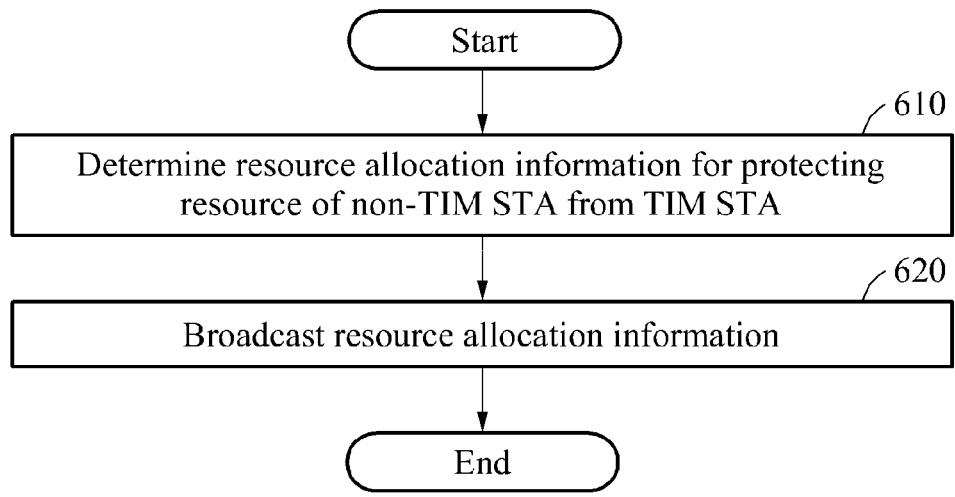
FIG. 6 is a flowchart illustrating a channel access control method according to an embodiment of the present invention.

FIG. 6 is a flowchart illustrating a channel access control method according to an embodiment of the present invention.

In operation 610, an AP may determine resource allocation information for protecting a resource for a non-TIM STA from a TIM STA. The AP may perform a setup process with the non-TIM STA to protect the resource for the non-TIM STA. The AP may determine whether to protect the resource or determine a resource to protect through the setup process with the non-TIM STA. The setup process between the AP and the non-TIM STA has been described above with reference to FIG. 3.

The AP may determine resource allocation information for restricting channel access of the TIM STA in a time period for channel access of the non-TIM STA. For instance, the resource allocation information may include information on an RAW for protecting the resource for the non-TIM STA. The AP may receive request data for resource protection from the non-TIM STA. When the request data is received, the AP may generate the resource allocation information for protecting the resource for the non-TIM STA not referring to TIM information from the TIM STA referring to the TIM information.

In operation 620, the AP may broadcast the resource allocation information determined in operation 610. The resource allocation information may be transmitted, being included in a beacon signal. The TIM STA may receive the beacon signal from the AP and acquire the RAW information allocated for the non-TIM STA by referring to the resource allocation information included in the beacon signal. The TIM STA does not perform channel access in the time period corresponding to the RAW allocated for the non-TIM STA, thereby reducing unnecessary power consumption.

The example embodiments described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method of controlling channel access performed by an access point (AP) in a wireless local area network (WLAN) system, the method comprising:
   receiving, from a target wake time (TWT) station (STA), a request frame comprising a bit value indicating whether protection of a resource for a TWT is requested to the AP;
   determining whether the resource for the TWT is to be protected;
   transmitting, to the TWT STA, a response frame comprising a bit value indicating whether the resource for the TWT is to be protected, in response to receiving the request for the protecting the resource; and
   transmitting, to traffic indication map (TIM) STAs, a beacon frame including TIM information indicating that the TWT STA is allowed to access during the protected resource for the TWT,
   wherein an STA listens for the beacon frame including the TIM information when the STA is a TIM STA.

2. The method of claim 1, wherein the STA sets the bit value of the request frame to 1 to request the protection of the resource.

3. The method of claim 1, wherein the STA sets the bit value of the request frame to 0 not to request the protection of the resource.

4. The method of claim 1, wherein when the bit value of the response frame is 1, the bit value of the response frame indicates the resource is to be protected by allocating a restricted access window (RAW).

5. The method of claim 1, wherein when the bit value of the response frame is 0, the bit value of the response frame indicates that the resource is not protected.

6. The method of claim 1, further comprising:
   allocating a restricted access window (RAW) for protecting a TWT service period of the STA in response to receiving the request for the protecting the resource from the STA.

7. The method of claim 6, further comprising:
   transmitting the beacon frame comprising information on the allocated RAW.

8. An access point (AP) comprising:
   a transceiver; and
   a processor,
   wherein the processor is configured to:
   cause the transceiver to receive, from a target wake time (TWT) station (STA), a request frame comprising a bit value indicating whether protection of a resource for a TWT is requested to the AP;
   determining whether the resource for the TWT is to be protected;
   cause the transceiver to transmit, to the TWT STA, a response frame comprising a bit value indicating whether the resource for the TWT is to be protected, in response to receiving the request for the protecting the resource; and
   cause the transceiver to transmit, to traffic indication map (TIM) STAs, a beacon frame including TIM information indicating that the TWT STA is allowed to access during the protected resource for the TWT,
   wherein an STA listens for the beacon frame including the TIM information when the STA is a TIM STA.

9. A method of controlling channel access performed by a target wake time (TWT) station (STA) in a wireless local area network (WLAN) system, the method comprising:
   transmitting, to an access point (AP), a request frame comprising a bit value indicating whether protection of a resource for a TWT is requested to the AP;
   receiving, from the AP, a response frame comprising a bit value indicating whether the resource for the TWT is to be protected, in response to receiving the request for the protecting the resource,
   wherein the TWT STA is allowed to access during the protected resource for the TWT.

10. The method of claim 9, wherein the STA sets the bit value of the request frame to 1 to request the protection of the resource, and
   wherein the STA sets the bit value of the request frame to 0 not to request the protection of the resource.

11. The method of claim 9, wherein when the bit value of the response frame is 1, the bit value of the response frame indicates the resource is to be protected by allocating a restricted access window (RAW), and
   wherein when the bit value of the response frame is 0, the bit value of the response frame indicates the resource is not protected.

12. The method of claim 9, wherein the AP allocates a restricted access window (RAW) for protecting a TWT service period of the STA in response to receiving the request for the protecting the resource from the STA.

13. A target wake time (TWT) station (STA) comprising:
   a transceiver; and
   a processor,
   wherein the processor is configured to:
   cause the transceiver to transmit, to an access point (AP), a request frame comprising a bit value indicating whether protection of a resource for a TWT is requested to the AP;
   cause the transceiver to receive, from the AP, a response frame comprising a bit value indicating whether the resource for the TWT is to be protected, in response to receiving the request for the protecting the resource,
   wherein the TWT STA is allowed to access during the protected resource for the TWT.

* * * * *